(12) United States Patent
Nakai

(10) Patent No.: US 7,839,733 B2
(45) Date of Patent: Nov. 23, 2010

(54) OPTICAL DEVICE AND OPTICAL DISC APPARATUS UTILIZING THE OPTICAL DEVICE

(75) Inventor: Kenya Nakai, Nagaokakyo (JP)

(73) Assignee: Mitsubishi Electric Corporation, Tokyo (JP)

(*) Notice: Subject to any disclaimer, the term of this patent is extended or adjusted under 35 U.S.C. 154(b) by 536 days.

(21) Appl. No.: 11/885,803

(22) PCT Filed: Dec. 26, 2005

(86) PCT No.: PCT/JP2005/023769

§ 371 (c)(1),
(2), (4) Date: Feb. 21, 2008

(87) PCT Pub. No.: WO2006/098071

PCT Pub. Date: Sep. 21, 2006

(65) Prior Publication Data

US 2008/0137495 A1 Jun. 12, 2008

(30) Foreign Application Priority Data

Mar. 8, 2005 (JP) .............................. 2005-063988

(51) Int. Cl.
*G11B 7/00* (2006.01)
(52) U.S. Cl. .............................. 369/44.32; 369/112.01; 369/112.03; 369/112.05; 369/112.15; 369/112.1
(58) Field of Classification Search ............... 369/44.32, 369/112.01, 112.03, 112.05, 112.1, 112.15
See application file for complete search history.

(56) References Cited

U.S. PATENT DOCUMENTS 4,163,149 A  7/1979  Sawano et al.
4,358,200 A  11/1982  Heemskerk et al.
5,283,774 A   2/1994  Mashimo
5,850,081 A  12/1998  Yanagisawa
2002/0018434 A1*  2/2002  Sugiura et al. .......... 369/112.15
2002/0159342 A1* 10/2002  Ogasawara et al. ...... 369/44.23

FOREIGN PATENT DOCUMENTS

| JP | 53-19807 A    | 2/1978  |
|----|---------------|---------|
| JP | 56-057013 A   | 5/1981  |
| JP | 60-242524 A   | 12/1985 |
| JP | 62-139143 A   | 6/1987  |
| JP | 1-258234 A    | 10/1989 |
| JP | 2-265027 A    | 10/1990 |
| JP | 4-013239 A    | 1/1992  |
| JP | 5-174407 A    | 7/1993  |
| JP | 6-195729 A    | 7/1994  |
| JP | 7-93772 A     | 4/1995  |
| JP | 10-64080 A    | 3/1998  |
| JP | 2001-014689 A | 1/2001  |

* cited by examiner

*Primary Examiner*—Wayne R Young
*Assistant Examiner*—Latanya Bibbins
(74) *Attorney, Agent, or Firm*—Birch, Stewart, Kolasch & Birch, LLP

(57) ABSTRACT

A signal, which is derived from the relationship between the lens shift amount of an objective lens and the amount of the positional-deviation, of a received light beam with respect to a light-receiving plane, which occurs in the tangential direction on a photodetector, is corrected by an offset caused by asymmetry in the intensity distribution of reflected light; a multiplication value is obtained by multiplying the corrected signal by a predetermined constant; based on a focus error signal obtained by subtracting the calculated value from the calculation expression according to the conventional astigmatism method, the focusing servo control is performed.

12 Claims, 9 Drawing Sheets

OPTICAL DEVICE AND OPTICAL DISC APPARATUS UTILIZING THE OPTICAL DEVICE

TECHNICAL FIELD

The present invention relates to an optical device for observing the surface contour of and the distance to a subject, by utilizing a light beam from a light source such as a laser generator, and to an optical disk apparatus for performing recording of information on and reproducing of information from a CD (Compact Disk), a DVD (Digital Versatile Disk), an MD (Mini Disk), an optical disk which enables further high-density recording, or the like, by use of the optical device.

BACKGROUND ART

A technology for measuring the distance to a subject by use of a laser beam or for focusing a laser beam has become widespread. Here, as an example of the technology, an optical disk apparatus that, by use of an optical information recording medium (referred to as an optical disk, hereinafter), performs writing and reading of digital data will be described.

In an optical disk apparatus that records information on an optical disk and reproducing the recorded information, focusing servo control is performed in such a way that a light beam emitted from a light source such as a laser generator is focused on an optical disk through an objective lens and the like, a focus error signal, which corresponds to a positional deviation between a light beam focal point on the optical disk and the recording surface of the optical disk, is generated so as to maintain the focusing state, based on an electric signal obtained by detecting, at a plurality of light-receiving planes, the reflected beam from the optical disk, and by utilizing the focus error signal, as a control signal, the objective lens is driven in the optical-axis direction thereof so as to focus the light beam.

Meanwhile, an optical disk apparatus has been enabled, by the technological advancement in semiconductor lasers and the improvement in microfabrication, to perform high-capacity recording and is widely spreading not only in computer data recording but also in the audio and video fields. In recent years in particular, as in the case of moving-picture information, the amount of data to be dealt with has drastically increased; thus, by diminishing the pitch of rows (referred to as tracks, hereinafter), on an optical disk, in each of which information signals and information signals are linearly arrayed in series in the optical-disk rotation direction and by shortening the wavelength of a semiconductor laser beam, the capacity of an optical disk apparatus has further been enlarged.

In such a background, in order to perform high-density recording on an optical disk or to reproduce the recorded information signal, an optical device is required that has a light-focusing function insusceptible to the effect of a component positional deviation and the like caused by manufacturing variations and changes with time.

Focus-error detection methods for generating the focus error signal are exemplified by the astigmatism method.

The astigmatism method is a focus-error detection method which is widely utilized not only in an optical disk apparatus but also in an optical device for detecting a focus error and correcting focusing and optical devices, such as a measurement apparatus and an observation apparatus, for observing the surface contour of a subject, by detecting a change in the focus error signal, as a microscopic distance change from the distance.

In the astigmatism method, the focus error signal is generated in such a way that a light beam focused by an objective lens or the like is irradiated onto a subject (an optical disk, in the case of an optical disk apparatus); the reflected light beam from the reflection surface of the subject is caused to possess astigmatism and after being converted, e.g., by a lens into a convergent beam, received through a light-receiving plane that is divided by crossed dividing lines into four segments and oriented in accordance with a direction in which the astigmatism occurs; and the difference between two pairs of addition signals, which are each obtained by adding the output signals, among output signals from the light-receiving planes, which are diagonal to each other, is made.

The level of the focus error signal varies in accordance with the distance between the focal point of the light beam and the reflection surface of the subject; when the focal point of the light beam coincides with the position of the reflection surface (the recording surface, in the case of an optical disk apparatus) of the subject, the received light beam on the light-receiving plane forms an approximate least-confusion circle; additionally, the focus error signal shows a characteristic that, when the adjustment of the positions of the light-receiving plane and the received light beam is made in such a way that the output value of the focus error signal is a predetermined value near to zero, the polarity of the focus error signal changes depending on whether the focal point of the light beam is located before or behind the recording surface of the optical disk.

In other words, when the focal point of the objective lens traces from a point that is located before and far away enough from the recording surface of the optical disk to a point that is located behind and far away enough from the recording surface of the optical disk, an S-shaped focus-error-signal waveform is obtained. The S-shaped focus-error-signal waveform will be referred to as an "S-curve waveform".

In particular, in an optical disk apparatus that performs reproducing from and recording on an optical disk, focusing servo control is carried out so that the position of the recording surface of the optical disk coincides with the focal point of a light beam which is focused by the objective lens, for example, by driving the objective lens toward the focal point so that the focus error signal becomes a predetermined value (e.g., zero).

However, in this method, in the case where, due to a change with time or insufficient adjustment, of positions of the light-receiving plane and optical components, upon assembly of the optical system of the optical disk apparatus, the positional deviation, of a reflected light beam, with respect to the four-segment light-receiving plane occurs in a direction that is slanted from the dividing line on the light-receiving plane, the focus error signal does not coincide with the predetermined value when the position of the optical-disk recording surface is the same as that of the light-beam focal point.

That is to say, it has been a problem that, when the same focusing servo control as described above is performed under the condition that an offset occurs in the focus error signal, the light beam is not focused on the optical-disk recording surface.

In this regard, measures (e.g., refer to Patent Document 1) have been contrived in which, through the multiplication of the right-left-pair-addition difference signal of a photodetector and the top-bottom-pair-addition difference signal, a correction signal is generated, and the focus error signal according to the conventional astigmatism method is corrected by use of the correction signal so as to be a focus error signal; however, even in the case of the foregoing measures, it has been a problem that, in the case where a positional deviation of a received light beam occurs in a direction that is slanted from the dividing line on the four-segment light-receiving plane or in the case where, due to asymmetry in the reflected-beam intensity distribution, an offset occurs, the focus error signal cannot correctly be obtained, whereby the focusing servo control cannot be performed.

[Patent Document 1] Japanese Patent Application Laid-Open No. 1998-64080 (FIG. 7 and Equation 4)

DISCLOSURE OF THE INVENTION

Problems to be Solved by the Invention

The present invention has been implemented in order to solve the foregoing problems; the objective of the present invention is to provide an optical device and an optical disk apparatus each including a focus-error-signal generation circuit for generating a focus error signal that causes no focal-point deviation, even in the case where, due to a change with time or insufficient adjustment, of positions of the light-receiving plane and optical components, upon assembly of the device, or due to the shift (referred to as a lens shift, hereinafter), in a direction along the radius of an optical disk (referred to as a radial direction, hereinafter), of the objective lens, the positional deviation, of a received light beam, with respect to the four-segment light-receiving plane occurs, or even in the case where, due to asymmetry in reflected-light-beam intensity distribution, an offset occurs.

Means for Solving the Problems

An optical disk apparatus according to the present invention is characterized in that an optical device, which is provided with an optical unit including a light source for emitting a light beam; a light focusing means for focusing the light beam onto a subject; an astigmatism addition means for adding astigmatism to a reflected light beam that is the light beam that has been reflected by the subject; and a photodetector, having a light-receiving region divided into four segments by a first dividing line and a second dividing line that cross each other, for detecting through the light-receiving region a light amount of the reflected light beam to which astigmatism has been added by the astigmatism addition means and converting the light amount into an electric signal, and a focus-error detection means for detecting an amount of focus error, with respect to the subject, of the light beam that is focused by the light focusing means, by utilizing a diagonal-addition difference signal obtained by making a subtraction between addition signals each obtained by adding electric signals, for the light-receiving segments that are situated diagonally to each other, among electric signals, corresponding to light amounts detected at the four light-receiving segments, which are outputted from the optical unit, further includes a first control signal generation means for detecting a first control signal, by making a subtraction between addition values each obtained by adding light amounts detected at the light-receiving segments, among the four light-receiving segments, which are adjacent to each other with respect to the first dividing line; and a second control signal generation means for detecting a second control signal, by making a subtraction between addition values each obtained by adding light amounts detected at the light-receiving segments, among the four light-receiving segments, which are adjacent to each other with respect to the second dividing line, and at least one of the first control signal and the second control signal is corrected by an offset component caused by asymmetry in an intensity distribution of the reflected light beam to which astigmatism has been added, and the diagonal-addition difference signal being corrected by a multiplication signal obtained by making a multiplication among the corrected first control signal, the corrected second control signal, and a predetermined constant.

Advantage of the Invention

According to an optical device and an optical disk apparatus of the present invention, an effect is demonstrated in which, even though, due to a change with time or insufficient adjustment, of positions of the four-segment light-receiving plane and optical components, upon assembly of the device, the received light beam is deviated, even though, in the case of the lens-shift operation, the received light beam deviates with respect to the light-receiving plane, or even though asymmetry in the intensity distribution of the reflected light beam causes an offset, no focal-point deviation is caused. Moreover, it is a great effect that the device can be realized without changing any part of an optical system that is utilized in a conventional astigmatism method.

BEST MODE FOR CARRYING OUT THE INVENTION

Embodiment 1

Figure 1:
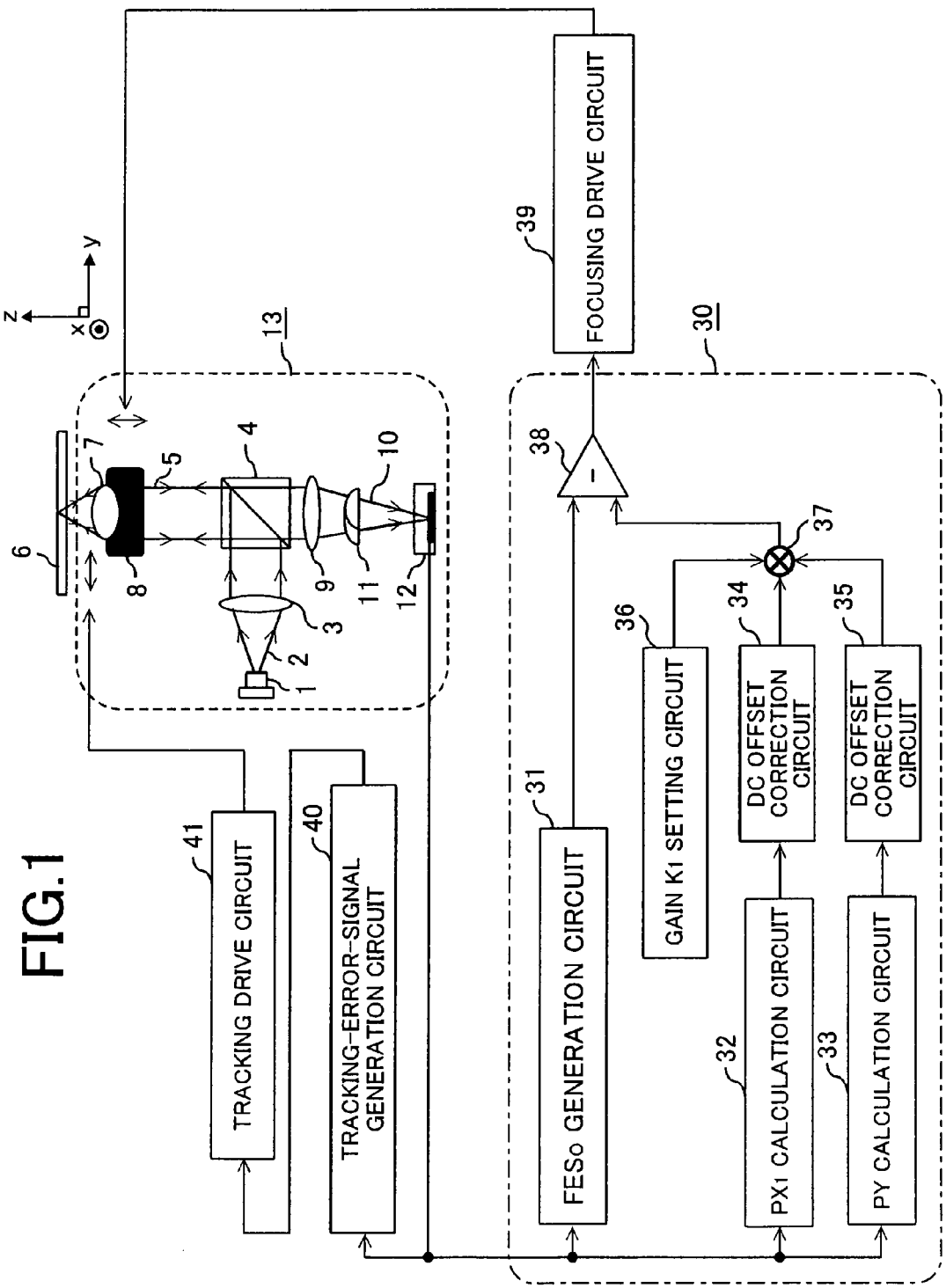
FIG. 1 is a configuration diagram for an optical disk apparatus according to Embodiment 1 of the present invention.
Figure 2:
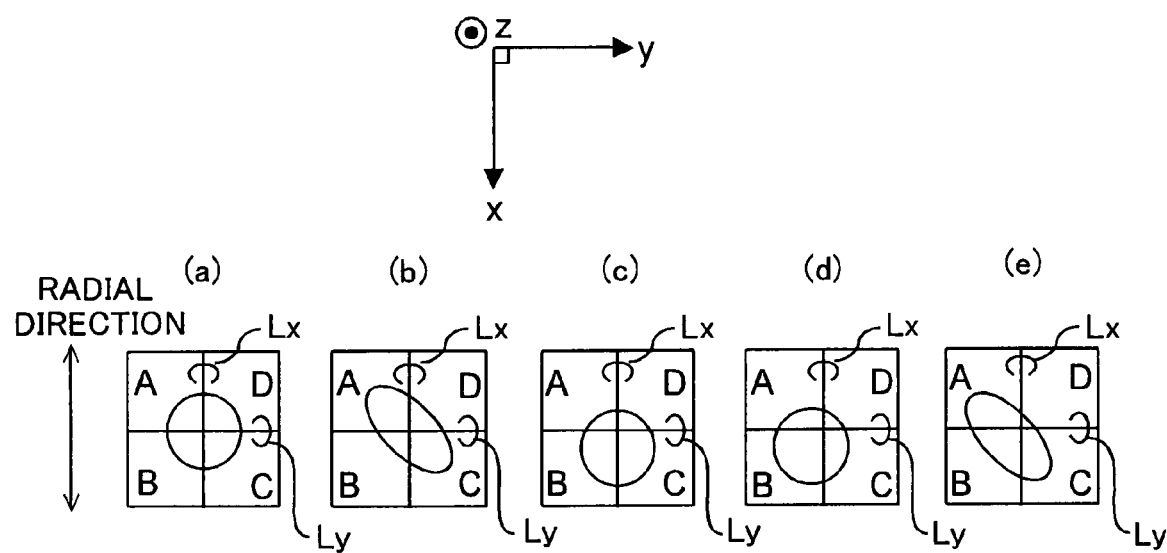
FIG. 2 is a plan view illustrating the light-receiving plane of a photodetector according to Embodiment 1 of the present invention.

FIG. 1 is a schematic diagram illustrating the configuration of an optical disk apparatus according to Embodiment 1 of the present invention; FIG. 2 is a set of schematic charts each representing a light-receiving condition on the four-segment light-receiving plane of a photodetector 12.

The configuration will be explained with reference to the drawings. A light beam 2 emitted from a semiconductor laser 1 as a light source is converted by a collimating lens 3 into a parallel light beam, deflected by the inner reflecting surface of a deflection prism 4 so as to be a light beam 5 that advances in the +z-axis direction, and then focused, by an objective lens 7 as a focusing means, onto an optical disk 6.

The objective lens 7 is mounted on a two-dimensional actuator 8 as a spot-focusing optical-axis-direction shifting means and a spot-focusing optical-axis-perpendicular-direction shifting means; the two-dimensional actuator 8 is structured so as to be able to be driven by an electric signal in both the optical-axis direction (the z-axis direction in FIG. 1) and the radial direction (the y-axis direction in FIG. 1) of the optical disk 6.

The light beam reflected by the optical disk 6 again penetrates the objective lens 7 and the deflection prism 4 and then is converted by an objective lens 9 into a convergent beam. A cylindrical lens 11 as an astigmatism addition means adds astigmatism to the convergent beam so that a light beam 10 is generated. A focus error is detected by utilizing the fact that, with the astigmatism added, in the case where the focal point is located on the optical disk 6, the shape of the reflected light that is irradiated onto the photodetector 12 becomes an approximate circle, and in the contrary case, the shape of the reflected light becomes an ellipsoidal; however, because the foregoing technology is well-known, the detailed explanation therefor will be omitted.

An optical recording-reproducing unit provided with the foregoing constituent elements is referred to as an "optical unit 13".

The photodetector 12 receives the light beam 10, through a light-receiving area that, as represented in FIG. 2, is divided into four segments, by a dividing line Lx as a first dividing line and a dividing line Ly as a second dividing line; the photodetector 12 outputs respective electric signals corresponding to light amounts received through the four light-receiving planes to a focus-error detection circuit 30 and a tracking-error-signal generation circuit 40.

The focus-error detection circuit 30 includes an $FES_o$ generation circuit 31 for generating $FES_o$ that is a diagonal-addition difference signal from the four light-receiving planes; a $PX_1$ calculation circuit 32 as a first control signal generation means for detecting a first control signal $PX_1$ that is the difference between the respective addition values for pairs of light-receiving areas that are adjacent to each other with respect to the dividing line Lx; a PY calculation circuit 32 as a second control signal generation means for detecting a second control signal PY that is the difference between the respective addition values for pairs of light-receiving areas that are adjacent to each other with respect to the dividing line Ly; DC-offset correction circuits 34 and 35 for correcting the respective offset components, caused by asymmetry in the intensity distribution of the reflected light beam, included in $PX_1$ and PY; a setting circuit 36 for setting a constant $K_1$ for multiplication; a multiplication circuit 37 for generating a multiplication signal obtained through multiplication among the offset-corrected $PX_1$, the offset-corrected PY, and the constant $K_1$; and a correction circuit 38 for correcting the diagonal-addition difference signal by use of the multiplication signal.

A control signal obtained by performing the foregoing correction calculation is outputted to a focusing drive circuit 39 as an optical-axis-direction drive circuit. Based on the control signal, the focusing drive circuit 39 outputs a focusing drive signal for driving the two-dimensional actuator 8, thereby shifting the objective lens 7 in the optical-axis direction (z-axis direction) so as to focus the light beam on the optical disk 6.

Although not illustrated, the focusing drive circuit 39 also has a function of performing switching between the focusing-servo operating state and the focusing-servo non-operating state, as may be necessary, e.g., in response to the recording or reproducing operation of the optical disk apparatus or to the insertion or ejection of an optical disk.

Meanwhile, although the explanation therefor will be omitted, the tracking-error-signal generation circuit 40 generates a tracking error signal, based on a well-used tracking-error detection method such as the push-pull method, the DPD method (differential-phase-detection method), or the differential-push-pull method, and inputs the tracking error signal to a tracking drive circuit 41 as an optical-axis-perpendicular-direction drive circuit. The tracking drive circuit 41 amplifies the tracking error signal and outputs a tracking drive signal so that the two-dimensional actuator 8 is driven so as to shift the objective lens 7 in the radial direction of the optical disk 6 and the position, in the radial direction, of the light beam which is focused onto the optical disk is made to keep track of the information track.

Although not illustrated, the tracking drive circuit 41 also has a function of performing switching between the tracking-servo operating state and the tracking-servo non-operating state, in response to the recording or reproducing operation of the optical disk apparatus or to the so-called seek operation in which, by an optical-unit shifting means such as an external motor, the optical unit is dynamically moved, in the radial direction of the optical-disk plane, toward a target recording area so as to access data.

As described above, FIG. 2 is a set of schematic charts each representing the four-segment light-receiving plane of the photodetector 12 and a received light beam irradiated onto the photodetector 12; the four-segment light-receiving plane is divided by the crossed dividing lines Lx and Ly into light-receiving elements A, B, C, and D; in the configuration in Embodiment 1, the dividing lines Lx and Ly are approximately parallel to the x axis and the y axis, respectively.

The respective areas of the portions of the received light beam irradiated onto the light-receiving elements A, B, C, and D are defined as $S_A$, $S_B$, $S_C$, and $S_D$; the respective light amounts of light beams detected at $S_A$, $S_B$, $S_C$, and $S_D$ are defined as $P_A$, $P_B$, $P_C$, and $P_D$.

In addition, the directions of the coordinate axes x, y, and z correspond to those of the coordinate axes x, y, and z illustrated in FIG. 1. Additionally, the symbol for the coordinate axis x in FIG. 1 and the coordinate axis z in FIG. 2 indicates the direction perpendicular to the paper (the polarities of the coordinate axes upwardly perpendicular to the front side of the paper are positive).

As represented in FIG. 2(a), ideally, under the condition that the light beam 5 is focused on the optical disk 6, the position of the objective lens 7 is adjusted in the z-axis direction in such a way that the effect of astigmatism makes the light beam 10 form an approximate least-confusion circle and adjusted in the x-y plane in such a way that the respective amounts of light beams received through the light-receiving elements A, B, C, and D of the four-segment light-receiving plane are equal to one another, and then fixed.

Next, the operation will be explained; in the first place, focusing servo operation according to a conventional focus-error detection method and the problems thereof will be described.

As is well known, the focus error signal according to the conventional astigmatism method is obtained as the diagonal-addition difference signal $FES_o$ $(=(P_A+P_C)-(P_B+P_D))$ on the photodetector 12. In the case where, as represented in FIG. 2(a), the light beam 5 is focused on the optical disk 6, $P_A=P_B=P_C=P_D$; therefore, $FES_o$ described above becomes zero, whereby the operating point of the focusing servo does not change and the light beam 5 is kept focused on the optical disk 6.

Next, when the condition changes from the foregoing case to the case where the light beam 5 is not focused on the optical disk 6, the effect of the astigmatism of the cylindrical lens causes the shape of the received light beam irradiated onto the photodetector to be an ellipsoidal extending in a diagonal direction of the light-receiving plane, as represented in FIG. 2(b). In this case, $P_A = P_C$, $P_B = P_D$, and $P_A \neq P_B$, $FES_o$ becomes a value other than zero; therefore, by performing the control in such a way that $FES_o$ becomes zero (i.e., in such a way that FIG. 2(a) is obtained), the light beam 5 can be focused correctly on the optical disk 6.

Additionally, in the case where the received light beam is adjusted so as to be at an ideal position at which no positional deviation in the y-axis direction is caused, a lens shift makes the received light beam on the light-receiving plane move along the dividing line Lx, as represented in FIG. 2(c); thus, $P_A = P_D$ and $P_B = P_C$, whereby no focus offset occurs in the focus error signal according to the conventional astigmatism method; therefore, even though, based on the focus error signal, the focusing servo operation is performed in such a way that $FES_o$ is kept to be zero, the operating point of the focusing servo does not change in principle, whereby the light beam 5 can be kept focused on the optical disk 6.

The reason why the received light beam shifts along the dividing line Lx is described below. That is because, in the astigmatism method, the position, in the z-direction, of the photodetector 12 is decided in such a way that the light beam 10 forms an approximate least-confusion circle, the y-axis on the optical disk 6 is reversed by 90° on the photodetector 12 to be projected onto the x-axis, whereby, when the objective lens 7 shifts along the y direction, the light beam on the photodetector 12 shifts along the x direction.

In this situation, when, under the condition that, due to a change with time or insufficient adjustment, of positions of the light-receiving plane and optical components, upon assembly of the device, the received light beam is deviated from the light-receiving plane of the photodetector 12 along the y-axis direction, the lens shift makes the received light beam shift approximately in parallel with the dividing line Lx, while keeping a certain distance, in the y-axis direction, from the dividing line Lx, the received light beam shifts, as represented in FIG. 2(d), from the point where the dividing lines Lx and Ly cross each other, in a direction slanted from the dividing lines Lx and Ly. In this case, even when the light beam is focused, i.e., the shape of the light beam on the photodetector is circular, $FES_o$ ($=(P_A+P_C)-(P_B+P_D)$), as represented in FIG. 2(d), does not become zero.

In the conventional method, control is performed in such a way that $FES_o$ becomes zero; as a result, because, when the shape of the light beam is ellipsoidal, i.e., the light beam is not focused (the shape of the light beam on the photodetector is not circular), $FES_o$ becomes zero, the received light beam cannot keep being the least-confusion circle that has initially been adjusted to be formed, whereby focal-point deviation of the light beam 5 is caused on the surface of the optical disk. The focal-point deviation causes deterioration in all kinds of characteristics such as the amplitude of the tracking error signal, the quality of a reproduced signal, and recording performance.

Moreover, even in the case where, as represented in FIGS. 2(a) and 2(c), the light beam is focused, i.e., the shape of the received light beam on the photodetector is circular, and the respective values for the light-receiving area ($S_A+S_C$) and the light-receiving area ($S_B+S_D$) are equal, an asymmetric variation, due to an imbalance in the optical system, in the reflected-light-beam intensity distribution makes the respective light amounts detected by the photodetector differ from one another, whereby the value ($P_A+P_C$) is not equal to the value ($P_B+P_D$); as a result, $FES_o$ does not become zero, whereby the focusing servo cannot correctly be performed.

The focusing servo operation according to a conventional focus error detection method and the problems thereof have been described heretofore.

Next, the operation according to Embodiment 1 of the present invention will be explained.

The $FES_o$ generation circuit 31 in the focus-error detection circuit 30 in FIG. 1 is to perform the same calculation as that performed for the focus error signal according to a so-called conventional astigmatism method; the $FES_o$ generation circuit 31 calculates and outputs $FES_o$ ($=(P_A+P_C)-(P_B+P_D)$) that is a diagonal-addition difference signal. The $PX_1$ calculation circuit 32 calculates and outputs $PX_1$ ($=(P_A+P_D)-(P_B+P_C)$). The PY calculation circuit 33 calculates and outputs PY ($=(P_A+P_B)-(P_C+P_D)$). The DC-offset correction circuits 34 and 35 correct $PX_1$ and PY by offset components $V_{DX}$ and $V_{DY}$, respectively, caused by asymmetry in the intensity distribution of the reflected light beam. Multiplication among the foregoing outputs and the gain $K_1$ is performed by the multiplication circuit 37; the focus-error detection circuit 30 outputs a calculation value FES obtained by correcting the output signal of the $FES_o$ generation circuit 31, based on the multiplication value.

In addition, $K_1$ can be either a positive value or a negative value, depending on setting of the direction of the astigmatism added in the cylindrical lens 11; the multiplication circuit and the correction circuits, which are each formed of an amplifier ranging from a negative value to a positive value, can apply calculation to a signal having either a positive value or a negative value.

The operation of the focus-error detection circuit 30 explained above will be represented by Equation (1).

$$FES = FES_o - K_1 \times (PX_1 + V_{DX1}) \times (PY + V_{DY}) \quad (1)$$

where $FES_o = (P_A+P_C)-(P_B+P_D)$, $PX_1 = (P_A+P_D)-(P_B+P_C)$, $PY = (P_A+P_B)-(P_C+P_D)$, $V_{DX1}$ is an offset component with regard to the dividing line Ly, $V_{DY}$ is an offset component with regard to the dividing line Lx, and $K_1$ is a constant.

In addition, the constant $K_1$ may be set in such a way that the focal-point deviation due to a lens shift is approximately zero (an optimal value); however, in the case where the focal-point deviation is not necessarily required to be zero over the whole range of the lens shift, i.e., in the case of an optical disk apparatus in which the necessary range of the lens shift may be small or in which the amount of the tolerable focal-point deviation is large, the gain value $K_1$ may not be the optimal value. Therefore, even when, in accordance with the system of an optical disk apparatus, the gain value $K_1$ is set to be deviated from the optimal value, an effect can be demonstrated in which the focal-point deviation, due to a lens shift, which occurs in the case of a conventional astigmatism method can be suppressed.

According to the consideration of the inventor, when $K_{best}$ denotes the optimal value of $K_1$, the effective gain-value setting range in which the focal-point-deviation suppression effect can be obtained is $0 < |K_1| \leq 2 \times |K_{best}|$.

The foregoing setting range can also apply to the gain values in other embodiments described later.

The focus error signal FES obtained through Equation (1) is inputted to the focusing drive circuit 39, and then the two-dimensional actuator 8 is driven in the optical-axis direction (the z-axis direction) of the objective lens 7 so that FES becomes zero.

Here, what $PX_1$ and $PY$ in Equation (1) mean will be described.

$PY$ is a calculation value represented by $(P_A+P_B)-(P_C+P_D)$; as represented in FIG. 2, $(P_A+P_B)$ is the addition of the light amounts at the left side of the photodetector, and $(P_C+P_D)$ is the addition of the light amounts at the right side of the photodetector. Taking it into account that the difference between the additions is created, it is conceivable that $PY$ is a value corresponding to a deviation of the received light beam, in the left-and-right direction, with respect to the light-receiving plane. Additionally, $PX_1$ is a value represented by $(P_A+P_D)-(P_B+P_C)$; similarly, it is conceivable that $PX_1$ is a value corresponding to a deviation of the received light beam, in the top-and-bottom direction, with respect to the light-receiving plane. Accordingly, it can be said that the value obtained by multiplying $PY$ by $PX_1$ is an amount corresponding to the travel amount, of the received light beam, in the diagonal direction of the light-receiving plane.

For example, it is determined in such a way that, because, even though the received light beam shifts along Lx, the travel amount in the left-and-right direction is zero, $PY=(P_A+P_B)-(P_C+P_D)=0$, whereby the travel amount in the diagonal direction is zero and, in contrast, because, even though the received light beam shifts along Ly, the travel amount in the top-and-bottom direction is zero, $PX_1=(P_A+P_D)-(P_B+P_C)=0$, whereby the travel amount in the diagonal direction is zero. In such cases, as represented in FIG. 2(c), control can be performed through the same calculation as that for the conventional $FES_o$.

In the case where, as represented in FIG. 2(d), the received light beam deviates in the diagonal direction of the light-receiving plane, Equation (1) demonstrates an effect; in that case, by appropriately setting the constant $K_1$, thereby performing correction through the value of the second term of Equation (1), FES can be made to be zero even in the case of FIG. 2(d). In consequence, the light beam 5 can be kept focused correctly on the optical disk 6.

Moreover, $PX_1$ and $PY$ are corrected by use of the offset components $V_{DX}$ and $V_{DY}$, respectively, caused by asymmetry in the intensity distribution of the reflected light beam; therefore, even though a variation exists in the intensity distribution of the reflected light beam, it is made possible to correctly detect deviations of the received light beam, in the left-and-right and top-and-bottom directions, with respect to the light-receiving plane.

According to Embodiment 1, the focal-point deviation, on the surface of an optical disk, which occurs when a lens is shifted can be suppressed, whereby focusing servo control can be performed over a wide lens-shift range; furthermore, even though, due to a change with time or insufficient adjustment, of positions of the four-segment light-receiving plane and optical components, upon assembly of the device, the received light beam is deviated, even though, in the case of the lens-shift operation, the received light beam deviates with respect to the light-receiving plane, or even though asymmetry in the intensity distribution of the reflected light beam causes an offset, no focal-point deviation occurs; therefore, the reliability of an optical disk apparatus or an optical device can be enhanced, and both the adjustment cost and the production cost can be reduced.

Moreover, a magnifying lens, which has occasionally been utilized in order to diminish the deviation of a received light beam on the light-receiving plane, can be removed, whereby the cost and the number of components of an optical disk apparatus or an optical device can be reduced.

Still moreover, even though the direction of the positional deviation between the light-receiving plane and the received light beam is an arbitrary direction including a direction slanted from the dividing lines on the light-receiving plane, the focal-point deviation on an optical disk can be made approximately zero; therefore, the directions of the dividing lines on the light-receiving plane are not necessarily required to coincide with the corresponding lens-shift directions for the objective lens 7, whereby restriction in designing can be eliminated.

Furthermore, crosstalk, which, under the condition that a positional deviation exists between the light-receiving plane and the received light beam, occurs in the focus error signal according to an conventional astigmatism method because, when a light beam traverses the guide groove provided along an optical-disk information track or the recording-mark train recorded on an information track, the diffracted light of the light beam changes, can concurrently be suppressed; In particular, focusing servo control during the seek operation in which a light beam continuously traverses guide grooves or information mark trains can be stabilized.

Moreover, the balance, between the peak values of the s-curve waveform, which, in a conventional astigmatism method, is caused in principle when a positional deviation between the received light beam and the light-receiving plane occurs, is improved; thus, an external disturbance such as a vibration or an impact is much less likely to make the focusing servo out of control, whereby the focusing servo operation can be stabilized.

Meanwhile, in addition to the astigmatism addition function, the cylindrical lens 11 may have a lens function for leading the focal point of the light beam 10 to the optimal position; in that case, the objective lens 9 can be omitted, whereby the device can be simplified.

Still moreover, expansion of Equation (1) yields Equation (2).

$$FES = FES_o - K_1 \times PX_1 \times PY - K_1 \times V_{DX1} \times PY - K_1 \times V_{DY} \times PX_1 - K_1 \times V_{DY} \times V_{DX1} \tag{2}$$

It goes without saying that Equation (2) may be utilized.

Embodiment 2

Figure 3:
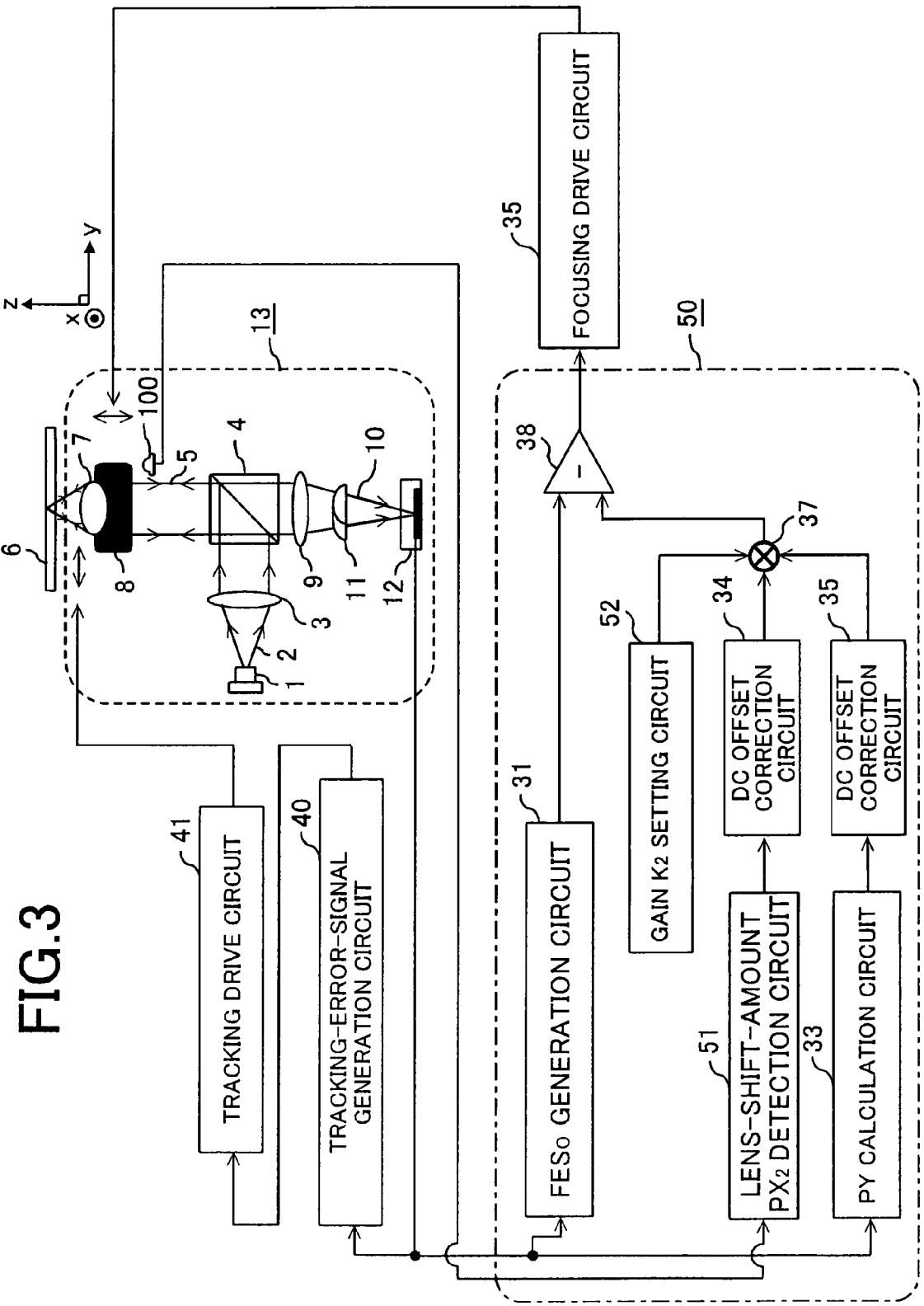
FIG. 3 is a configuration diagram for an optical disk apparatus according to Embodiment 2 of the present invention.

FIG. 3 is a schematic diagram illustrating the configuration of an optical disk apparatus according to Embodiment 2 of the present invention.

What differ from Embodiment 1 will mainly be explained. In FIG. 3, an objective lens position sensor 100, which is a position sensor for detecting a travel amount, of the two-dimensional actuator 8, in the radial direction as a direction perpendicular to the direction along the optical axis of a light beam, outputs a voltage corresponding to a lens shift amount. Accordingly, it can be said that the value of this voltage is a value that corresponds to the lens shift amount of the objective lens 7.

Based on the output signal $V_{LS}$ of the objective lens position sensor 100, a lens-shift-amount detection circuit 51 calculates a value $PX_2$ that corresponds to a top-and-bottom deviation, of a received light beam with respect to the light-receiving plane, which varies in accordance with the lens shift amount. $PX_2$ corresponds to $PX_1$ in Equation (1). A focus-error detection circuit 50 performs a calculation according to Equation (3), by use of data described above.

$$FES = FES_o - K_2 \times (PX_2 + V_{DX2}) \times (PY + V_{DY}) \tag{3}$$

Equation (3) is an equation, for suppressing a focal-point deviation upon a lens shift, which is obtained by replacing $PX_1$, the offset component $V_{DX1}$, and the gain $K_1$ in Equation (1) by $PX_2$, $V_{DX2}$, and $K_2$, respectively, i.e., by utilizing information from the position sensor 100 to replace the change in PX due to the lens shift; $V_{DX2}$ and $K_2$ are matched with the output of the position sensor 100. Other configurations and operations are the same as those of Embodiment 1; therefore, explanations therefor will be omitted.

According to Embodiment 2, the position sensor 100 is required; however, because not only the effect of Embodiment 1 is demonstrated but also the calculation of PX1 is not required, the calculation can be simplified.

In addition, in the case where the output signal $V_{LS}$ of the objective lens position sensor 100 is matched with the later-stage circuit, the lens-shift-amount detection circuit 51 may be omitted; in this case, the configuration can further be simplified. It goes without saying that the output from the position sensor 100 may be a current.

Embodiment 3

Figure 4:
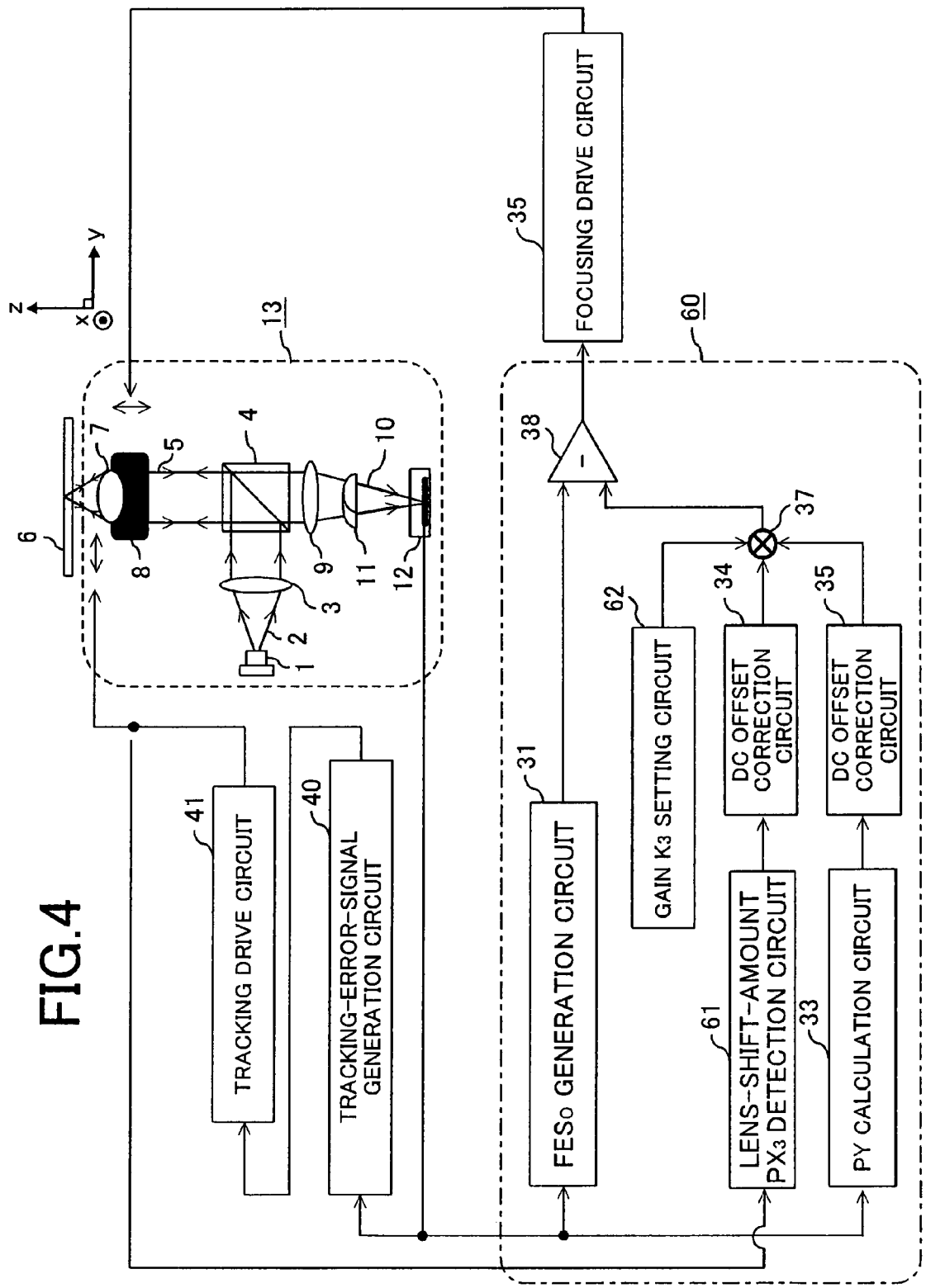
FIG. 4 is a configuration diagram for an optical disk apparatus according to Embodiment 3 of the present invention.

FIG. 4 is a schematic diagram illustrating the configuration of an optical disk apparatus according to Embodiment 3 of the present invention.

What differ from Embodiment 1 will mainly be explained.

In FIG. 4, the tracking drive circuit 41 outputs a drive signal for moving the two-dimensional actuator 8 in the radial direction as a direction perpendicular to the direction along the optical axis of a light beam. Because the objective lens 7 is moved by the drive signal in the radial direction, it can be said that the drive signal is a value that corresponds to a lens shift amount of the objective lens 7.

Based on the drive signal, a lens-shift-amount detection circuit 61 calculates a value $PX_3$ that corresponds to a top-and-bottom deviation, of a received light beam with respect to the light-receiving plane, which varies in accordance with the lens shift amount. $PX_3$ corresponds to $PX_1$ in Equation (1). A focus-error detection circuit 60 performs a calculation according to Equation (4), by use of data described above.

$$FES=FES_o-K_3 \times (PX_3+V_{DX3}) \times (PY+V_{DY}) \qquad (4)$$

Equation (4) is an equation, for suppressing a focal-point deviation upon a lens shift, which is obtained by replacing $PX_1$, the offset component $V_{DX1}$, and the gain $K_1$ in Equation (1) by $PX_3$, $V_{DX3}$, and $K_3$, respectively, i.e., by utilizing the drive signal from the tracking drive circuit 41 to replace the change in $PX_1$ due to the lens shift; $V_{DX3}$ and $K_3$ are matched with the output of the tracking drive circuit 41. Other configurations and operations are the same as those of Embodiment 1; therefore, explanations therefor will be omitted.

Because, according to Embodiment 3, not only the effect of Embodiment 1 is demonstrated but also the calculation of PX1 is not required, the calculation can be simplified.

In addition, in the case where the drive signal from the tracking drive circuit 41 is matched with the later-stage circuit, the lens-shift-amount detection circuit 61 may be omitted; in this case, the configuration can further be simplified.

Additionally, the configuration may be in such a way that, instead of the drive signal from the tracking drive circuit 41, either the value of an offset, which occurs in principal in accordance with a lens shift amount, of a tracking error signal which, according to the push-pull method or the DPD method, is generated in the tracking-error-signal generation circuit 40, or the offset value of a subbeam push-pull signal required in the DPP tracking-error detection method is utilized. In that case, instead of the output of the tracking drive circuit 41 illustrated in FIG. 6, a signal outputted from the tracking-error-signal generation circuit 40 is inputted to the lens-shift-amount detection circuit 61.

Embodiment 4

In the foregoing embodiments, as a means for adding astigmatism, the cylindrical lens 11 is utilized; however, astigmatism may be added by use of a flat-plate half mirror, instead of the cylindrical lens 11. An example thereof is illustrated in FIG. 5.

What differ from Embodiment 1 will mainly be explained.

Figure 5:
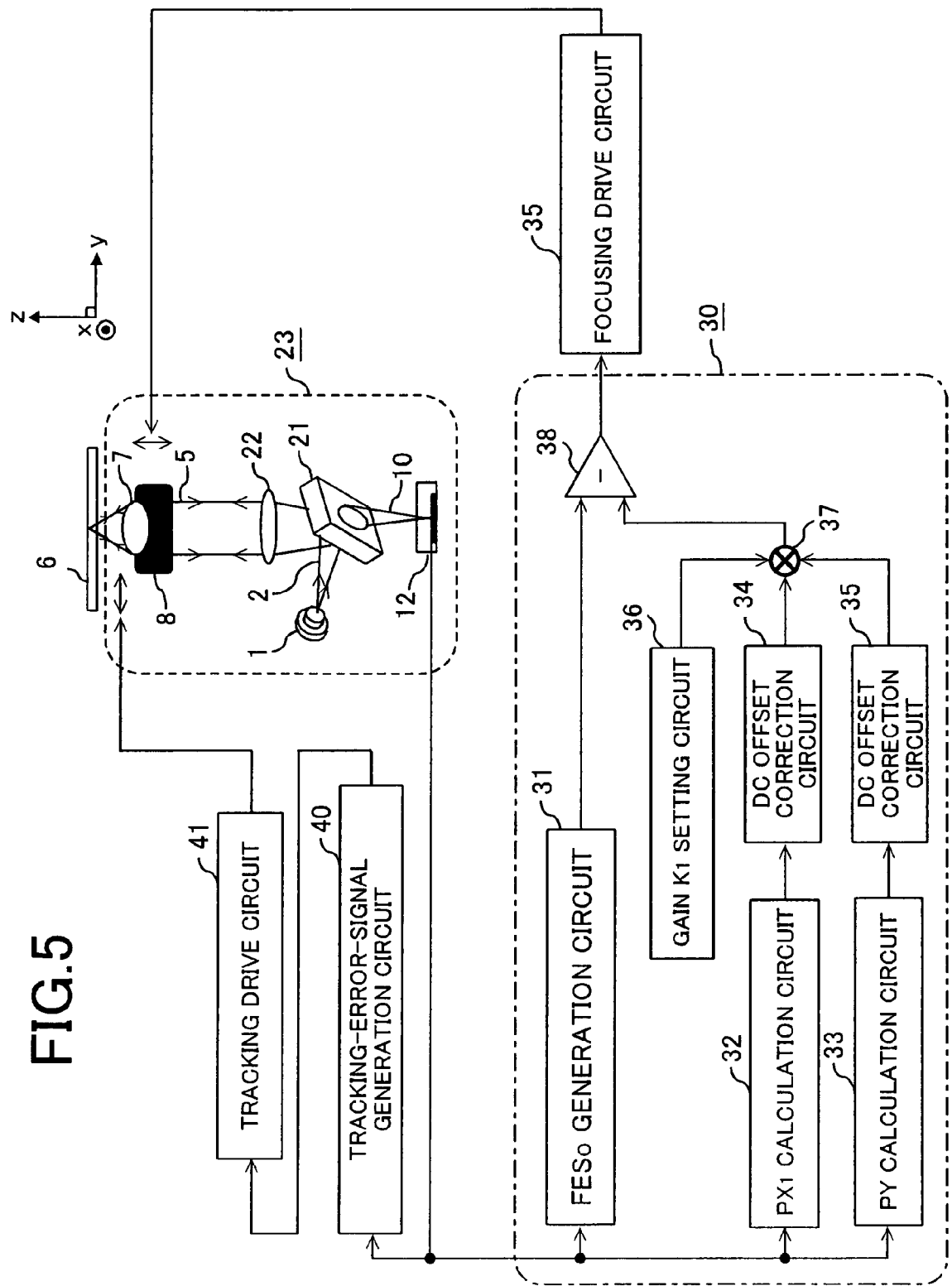
FIG. 5 is a configuration diagram for an optical disk apparatus according to Embodiment 4 of the present invention.

In FIG. 5, the light beam 2 emitted from the semiconductor laser 1 is deflected along the +z-axis direction by a flat-plate half mirror 21 as a flat-plate optical element, collimated by a collimating lens 22 to be the parallel light beam 5, and then focused by the objective lens 7 onto the optical disk 6.

The light beam reflected by the optical disk 6 again penetrates the objective lens 7, the collimating lens 22, and the flat-plate half mirror 21, and then the received light beam is focused onto the photodetector 12. The flat-plate half mirror 21 is disposed in such a way as to be slanted from the optical axis of the reflected light beam.

An optical recording-reproducing unit provided with the foregoing constituent elements is referred to as an "optical unit 23".

In this example, astigmatism is added by disposing the flat-plate half mirror 21 in such a way as to be slanted from the optical axis; however, because, even though the light-receiving plane of the photodetector 12 and the received light beam are adjusted in such a way that PY is zero under the condition that no lens shift exists, the shape of the received light beam on the light-receiving plane of the photodetector 12 is distorted or the light-intensity distribution becomes asymmetric, Light-amount differences among the light-receiving elements of the light-receiving plane cause an offset component, whereby the calculation of PY results in a value indicating as if the received light beam deviated along the y-axis direction of the light-receiving plane; thus, according to a conventional astigmatism method, a lens shift causes a focal-point deviation on an optical disk.

In other words, because the asymmetry in the intensity distribution of the reflected light beam causes a considerable offset, the present invention can demonstrate a great effect.

Other configurations are the same as those of Embodiment 1; therefore, explanations therefor will be omitted.

In the foregoing example, a case where, as a means for adding astigmatism, the flat-plate half mirror 21 is utilized has been explained; however, also in an optical disk apparatus in which, with light emitting elements in which a plurality of light sources are integrated so as to perform recording on and reproducing from various kinds of optical disks by use of the plurality of light sources, at least one light source is designed to be disposed off the axis of the objective lens and the collimating lens and in an optical disk apparatus in which, by deflecting the light path of a light beam, in a waveform-selection manner, through a diffraction element such as a hologram optical element, light beams emitted from a plurality of light sources are received with a common light-receiving plane so as to generate a focus error signal, the shape of a received light beam is distorted or the light-intensity distribution becomes asymmetric; therefore, it goes without saying that performing the same focusing servo control as described above can demonstrate the same effect.

In order to ascertain the effect of Embodiment 4, with regard to each of the cases of a conventional astigmatism method and the focusing servo operation of Embodiment 4, the inventor calculated, through a simulation, the amount of the focal-point deviation, which is caused by a lens shift, in the light beam on the optical disk 6 vs. the initial positional deviation between the light-receiving plane of the photodetector 12 and the received light beam, and then made a comparison between the simulated focal-point-deviation amounts.

[Conditions of Simulation]

In the simulation, the numerical aperture NA of the objective lens, the wavelength, the focal length of the objective lens, and the focal length of the collimating lens were set to 0.6, 650 nm, 3.36 mm, and 21.4 mm, respectively.

Here, as indexes each indicating the amount of the positional deviation between the light-receiving plane of the photodetector 12 and the received light beam, a light-amount balance in the x direction BX and a light-amount balance in the y direction BY are defined to be ((A+D)−(B+C))/(A+B+C+D) and ((A+B)−(C+D))/(A+B+C+D), respectively, and represented in percentage.

The simulation was carried out under the condition that the initial positional deviation BX, between the light-receiving plane and the received light beam, in the x-axis direction was (a) −25%, (b) 0%, or (c) +25% and, under each of the conditions (a) to (c), the initial positional deviation BY in the y-axis direction was +25%, +15%, 0%, −15%, or −25%.

[Results of Simulation]

Figure 6:
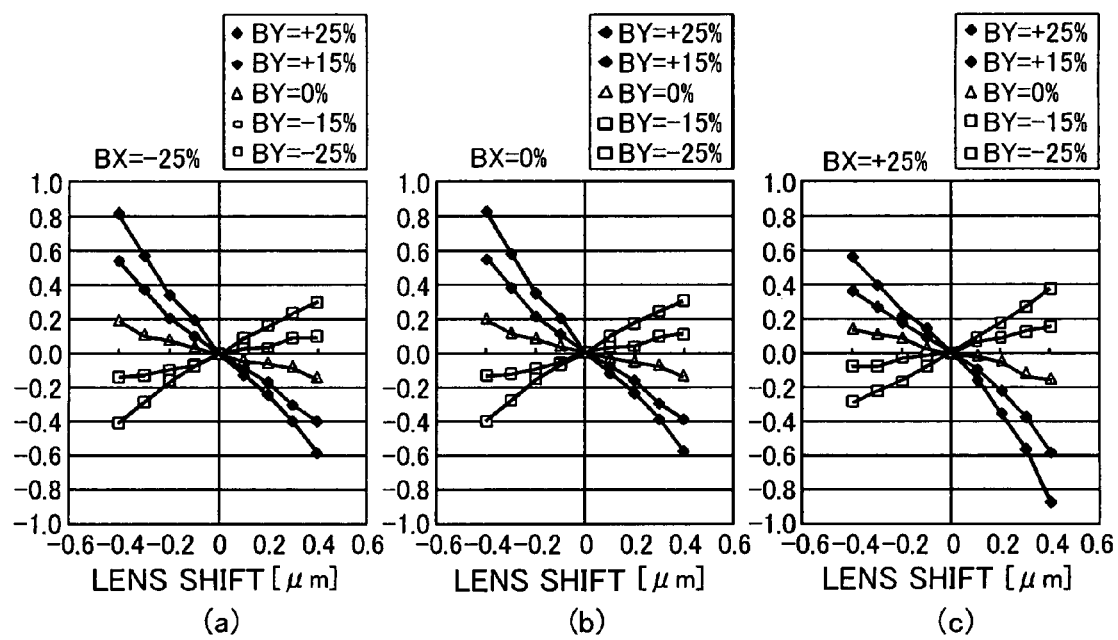
FIG. 6 is a set of graphs representing the focal-point deviation vs. the lens shift in the case where conventional and conventional focus error detection is performed in a configuration according to Embodiment 4 of the present invention.

FIG. 6 represents the results of the simulation utilizing the conventional astigmatism method. Due to the distortion of the shape of the received light beam, the characteristics are asymmetric with respect to the vertical line on which the lens shift is zero or the curve on which BY is zero. Additionally, even when BY is zero, the lens shift displays its effect.

Additionally, a large focal-point deviation is likely to occur under the condition that BX is negative and the lens shift amount is negative (i.e., the lens shifts toward the inner periphery) or that BX is positive and the lens shift amount is positive (i.e., the lens shifts toward the outer periphery); however, the focal-point-deviation amounts that occur under the two conditions described above decide the lens-shiftable range of an optical disk apparatus or the tolerance range of the positional deviation between the photodetector 12 and the received light beam, whereby the performance range of the optical disk apparatus is eventually narrowed.

Figure 7:
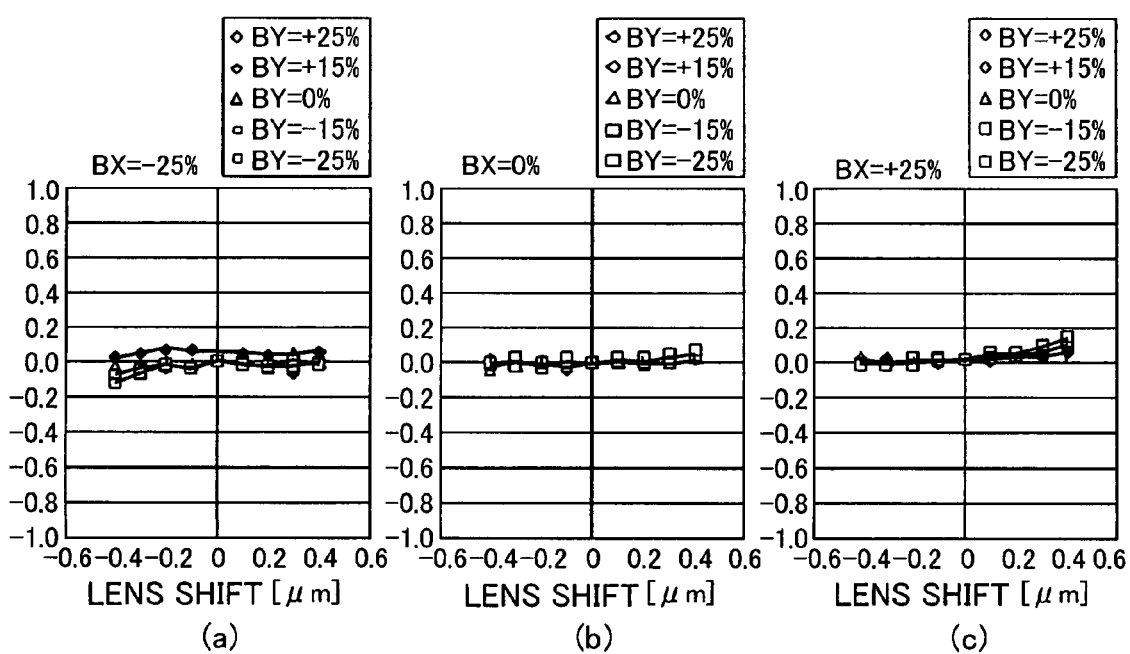
FIG. 7 is a set of graphs representing the focal-point deviation vs. the lens shift, according to Embodiment 4 of the present invention.

FIG. 7 represents the results in the case of Embodiment 4. In this case, it can be seen that, even though either BX or BY is changed, the focal-point deviation, which has been a problem in a conventional astigmatism method, hardly occurs.

The foregoing result of the simulation also evidenced the effect of Embodiment 4.

Embodiment 5

In each of the foregoing embodiments, the calculation expression for the focus error signal is specifically represented; it is conceivable to realize the calculation expression, for example, by means of software or the like suitable for development of an optical disk apparatus. In Embodiment 5, an example in which, as a method for realizing the calculation expression, a hardware logic circuit is utilized will be described.

Figure 8:
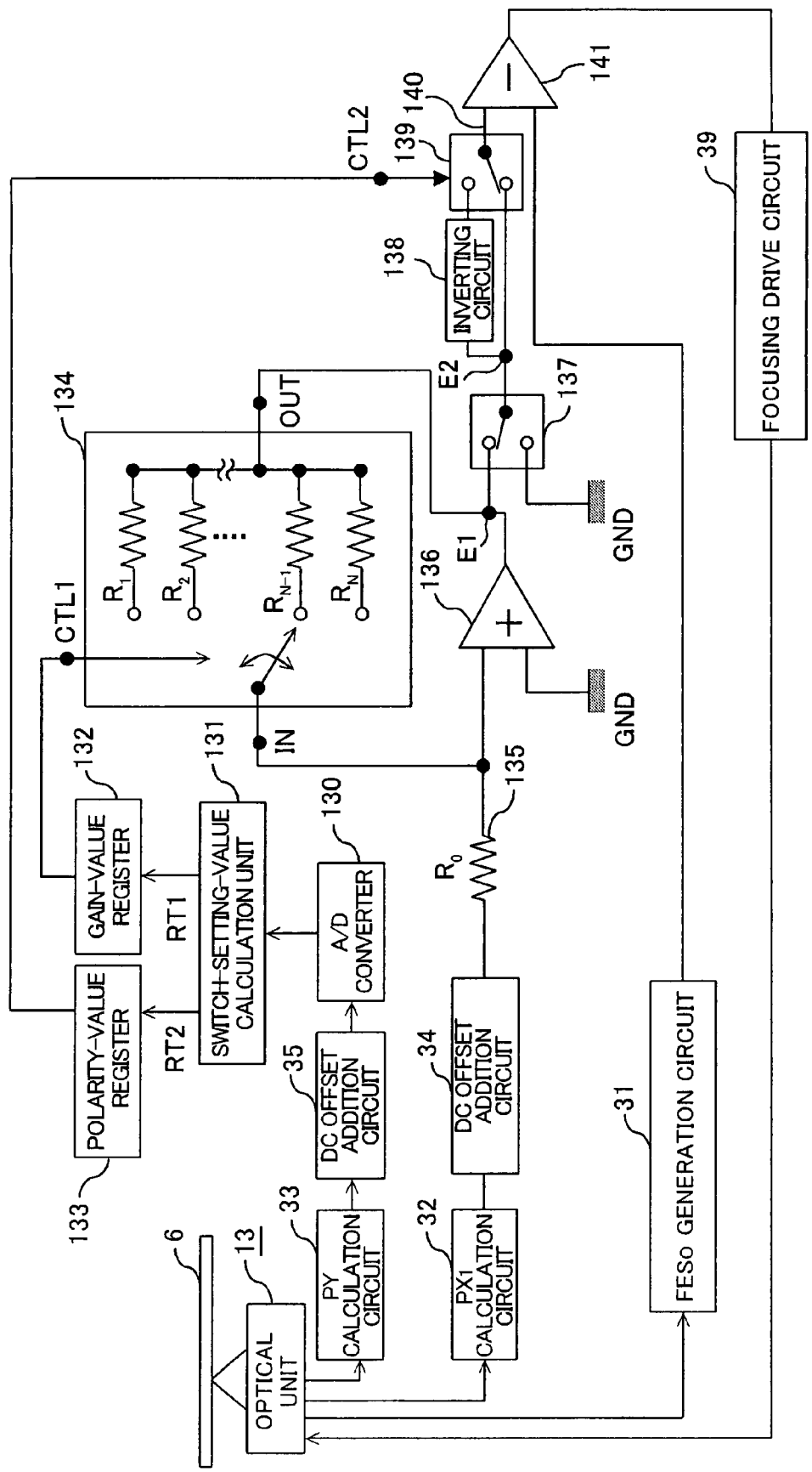
FIG. 8 is a configuration diagram for an optical disk apparatus according to Embodiment 5 of the present invention.

FIG. 8 is a schematic diagram illustrating the configuration of an optical disk apparatus according to Embodiment 5 of the present invention. In this example, a case in which Embodiment 1 is realized by a hardware logic circuit is described; the constituent elements that perform the same functions and operation items as those in FIG. 1, which illustrates the configuration of Embodiment 1 described above, are indicated by the same reference characters, and explanations therefor will be omitted. In addition, for simplicity, the calculation of the focus error signal is mainly descried.

After its offset component is corrected, PY ($=(P_A+P_B)−(P_C+P_D)$) outputted from the PY calculation circuit 33 is converted by an A/D converter 130 into a digital value and inputted to a switch-setting-value calculation unit 131. In the switch-setting-value calculation unit 131, the absolute value $|K_e|$ and the polarity of $K_e$ ($=K_1 \times (PY+V_{DY})$), which is calculated based on the value of PY and corresponds to the coefficient of $PX_1$ in Equation (1) that has been explained in Embodiment 1, are calculated; setting values RT1 and RT2 corresponding to the absolute value $|K_e|$ and the polarity, respectively, are decided and sent to a gain-value register 132 and a polarity-value register 133, respectively.

The gain-value register 132 and the polarity-value register 133 hold the setting values RT1 and RT2, respectively, and send the setting values RT1 and RT2 to an input terminal CTL1 of a switch-type variable resistor 134 and an input terminal CTL2 of a switching circuit 139, respectively.

The switch-type variable resistor 134 is a variable resistor whose resistance value between the input terminal IN and the output terminal OUT can be switched among N kinds of resistance values $R_1$ to $R_N$, through a value that is set at the control terminal CTL1; by integrating the switch-type variable resistor 134 with a resistor 135 having a resistance value $R_o$ and an amplifier 136, an amplification stage having N kinds of gain values $R_1/R_o$ to $R_N/R_o$ is configured.

With the foregoing configuration, the gain values that can be selectively set are limited to N kinds; therefore, in practice, the value of the analogue signal outputted from the offset correction circuit 35 is set by the switch-setting-value calculation unit 131 to be the setting values RT1 and RT2 corresponding to the gain value, which is closest, among the N kinds of gain values $R_1/R_o$ to $R_N/R_o$.

The switching circuit 137 selectively outputs the GND level or the output signal from the amplification stage configured with the switch-type variable resistor 134, the resistor 135 having the resistance value $R_o$, and the amplifier 136; the switching circuit 139 selectively outputs one of the two kinds of inputted signals, based on the value outputted from the polarity-value register 133. The configuration is in such a way that an inverting circuit 138 is arranged at one of the input terminals of the switching circuit 139; the switching circuit 139 is adapted to selectively output one of signals that are the output signal of the switching circuit 137 situated before the inverting circuit 138 and a signal obtained by inverting that output signal.

In contrast, after its offset component is corrected, the output signal of the $PX_1$ calculation circuit 32 is inputted to the amplifier 136 by way of the resistor 135, amplified with a magnification ratio corresponding to the setting value RT1 (i.e., the absolute value $|K_e|$), and then outputted as an output signal 140 whose polarity is decided, as described above, in accordance with the setting value RT2 (i.e., the polarity of $K_e$). Additionally, a subtractor 141 generates a difference signal based on the difference between the output signal $FES_o$ of the $FES_o$ generation circuit 31 and the output signal 140 and inputs the difference signal to the focusing drive circuit 39.

The focusing drive circuit 39 outputs a focusing drive signal for driving the two-dimensional actuator 8 provided in the optical unit 13, in such a way that the difference signal maintains a predetermined value, thereby shifting the objective lens 7 in the optical-axis direction (z-axis direction) so as to focus the light beam on the optical disk 6.

The amplifier 136, the inverting circuit 138, and the subtractor 141, each having an input range and an output range that each cover a range from a negative value to a positive value, can apply amplification or calculation to a signal having either a positive value or a negative value.

The operation, in FIG. 8, described above will be explained based on a flowchart represented in FIG. 9.

Figure 9:
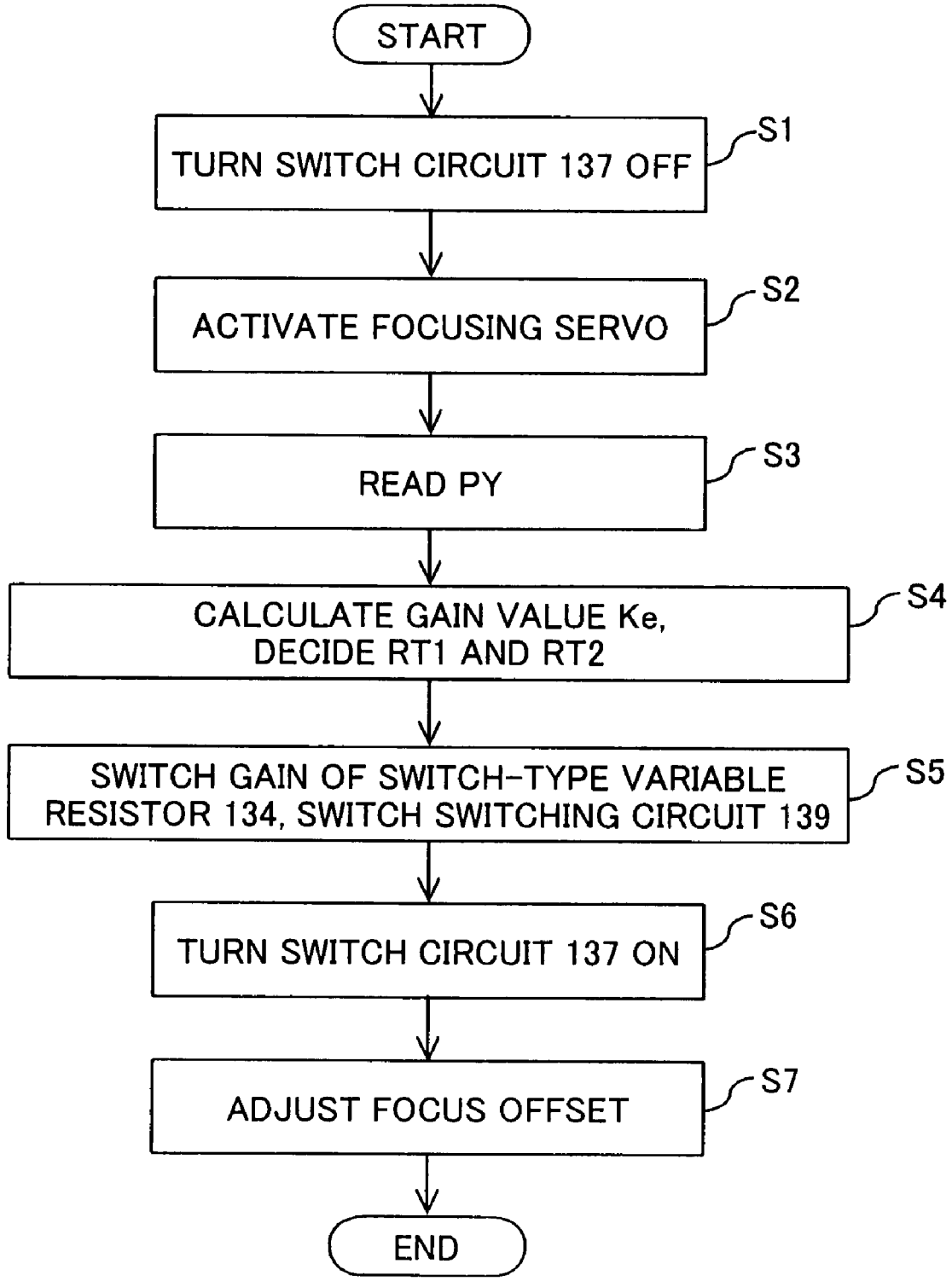
FIG. 9 is a flowchart representing operation steps according to Embodiment 5 of the present invention.

It is assumed that the operational procedure of the flowchart represented in FIG. 9 is started from a state immediately before the focusing servo operation is activated; the operational procedure will be explained sequentially.

After the optical disk 6 is inserted into the optical disk apparatus, the switching circuit 137 selects the GND level (Step S1); thus, only $FES_o$ outputted from the $FES_o$ generation circuit 31 is inputted to the subtractor 141.

Next, the focusing drive circuit 39 is activated so as to make the optical unit 13 start the focusing servo control with regard to the optical disk 6 (Step S2). On this occasion, the focusing drive circuit 39 amplifies, with an initially determined servo gain, the focus error signal $FES_o$ outputted from the subtractor 141 and outputs, as the focusing drive signal, the amplified signal so as to drive the two-dimensional actuator 8 in the optical unit. Additionally, in this situation, the focusing servo control is performed in such a way that the focus error signal $FES_o$ becomes zero; however, electrical focus-offset correction is not carried out.

After the foregoing operation, the PY value obtained in the offset correction circuit 35 is read (Step S3); then, in accordance with the PY value digitalized by the A/D converter 130, the switch-setting-value calculation unit 131 decides the setting values RT1 and RT2 (Step S4).

The setting values RT1 and RT2 decided as described above are temporarily stored in the gain-value register 132 and the polarity-value register 133, respectively, and then sent to the switch-type variable resistor 134; in accordance with the setting value RT1, the gain values of the switch-type variable resistor 134 are switched and in accordance with the setting value RT2, the switching circuit 139 is switched over (Step S5).

After that, the switching circuit 137 is switched over to the amplifier 136 (Step S6) so as to input the output signal 140, which has been obtained by multiplying $PX_1$ value outputted from the offset correction circuit 34 approximately by $K_e$, to the subtractor 141. Through Step S6, a signal calculated in accordance with $FES_o-K_e \times PX_1$ is outputted from the subtractor 141 and inputted to the focusing drive circuit 39, whereupon the focusing servo operation through the focus error signal FES ($=FES_o-K_e \times PX_1$) is initiated.

After the completion of the foregoing operation, in the focusing drive circuit 39, an offset is electrically added to the focus error signal FES (Step S7), in order to adjust the focus offset so that the quality of a recording/reproducing signal (e.g., the jitter value of the recording/reproducing signal) becomes best. In addition, the procedure may be in such a way that a step for adjusting the focusing-servo gain to be optimal is provided before or after Step S7 so that the servo operation is more stabilized.

According to Embodiment 5, because not only the effect of Embodiment 1 is demonstrated but also no multiplication circuit is required, an effect can be demonstrated in which a focal-point deviation, of a light beam, on the optical disk 6 can be suppressed with a simpler circuit configuration.

In Embodiment 5, an example in which a hardware logic circuit is applied to Embodiment 1 has been described; however, the application to any one of Embodiments 2 to 4 brings about the same effect. On that occasion, the coefficient $K_e$, which is obtained in the switch-setting-value calculation unit, may appropriately be set in such a way as to correspond to each embodiment.

Additionally, the optical unit 13 may be the optical unit 23, explained in Embodiment 4, which is provided with the flat-plate half mirror 21.

In each of the foregoing embodiments, the normalized value obtained by dividing $PX_1$ ($=(P_A+P_D)-(P_B+P_C)$) by the total light amount ($P_A+P_B+P_C+P_D$) received through the four-segment light-receiving plane of the photodetector and the normalized value obtained by dividing PY ($=(P_A+P_B)-(P_C+P_D)$) by the total light amount ($P_A+P_B+P_C+P_D$) may be utilized. In this case, the fluctuation, in the optimal gain value, which is caused by the change in the total light amount can be suppressed; therefore, for example, with regard to optical disks having different reflectances, a focal-point-deviation suppression effect can be obtained with approximately the same gain value.

Additionally, the values $(P_A-P_B)$, $(P_D-P_C)$, and $(P_A-P_B)/(P_A+P_B)$ and $(P_D-P_C)/(P_C+P_D)$ which are obtained by normalizing $(P_A-P_B)$ and $(P_D-P_C)$ through the respective additions of light amounts, change in the same manner, in a microscopic area, as $PX_1$ does, in accordance with a lens shift; therefore, each of the foregoing values can replace $PX_1$.

Meanwhile, the values $(P_A-P_D)$, $(P_B-P_C)$, and $(P_A-P_D)/(P_A+P_D)$ and $(P_B-P_C)/(P_B+P_C)$ which are obtained by normalizing $(P_A-P_D)$ and $(P_B-P_C)$ through the respective additions of light amounts, also change in the same manner, in a microscopic area, as PY does, in accordance with a lens shift; therefore, each of the foregoing values can replace PY.

Moreover, if an optical unit is utilized in which, with regard to the adjustment, in the x-y plane, of the photodetector 12, initial positional offsets are given to the y axis and x axis in such a way that PY becomes $-V_{DY}$ and $PX_1$ becomes $-V_{DX}$, a focal-point deviation that is caused by the distortion in the shape of a received light beam or by the asymmetry in the light-intensity distribution and a focal-point deviation that, in a conventional astigmatism method, occurs in principle can be suppressed, only by applying a focus-error detection circuit, in which the DC offset correction circuit is omitted, to an optical disk apparatus.

Still moreover, originally, no distinction exists between $L_x$ as the first dividing line of the photodetector 12 and $L_y$ as the second dividing line; accordingly, in whichever direction the received light beam travels on the photodetector 12, the effect of an offset can securely be eliminated by performing the calculation in accordance with each equation. In other words, although an example has been described in which, as represented in FIG. 2(c), the received light beam on the photodetector 12 travels in parallel with the dividing line $L_x$ (or $L_y$), the received light beam may travel in a direction that is not parallel to the dividing line. In that case, the restriction on the arrangement of the optical system is relaxed; thus, a further effect in which the device can be downsized is demonstrated.

Furthermore, in each of the foregoing embodiments, an example in which the present invention is applied to an optical disk apparatus has been explained; however, it goes without saying that, also in the case where the present invention is applied to an optical device for measuring the surface contour of or the distance to a subject other than an optical disk, the characteristics with regard to a focal-point deviation can be improved in the same manner, as long as the optical device is configured in such a way that a light beam reflected by the subject is received by a photodetector so as to detect the focal-point deviation, of the light beam, with respect to the subject.

The invention claimed is:
1. An optical device provided with
an optical unit comprising:
a light source for emitting a light beam;

a light focusing lens for focusing the light beam onto a subject;

an astigmatism addition lens for adding astigmatism to a reflected light beam that is the light beam that has been reflected by the subject; and a photodetector, having a light-receiving region divided into four segments by a first dividing line and a second dividing line that cross each other, for detecting through the light-receiving region a light amount of the reflected light beam to which astigmatism has been added by the astigmatism addition lens and converting the light amount into an electric signal, and a focus-error detector for detecting an amount of focus error, with respect to the subject, of the light beam that is focused by the light focusing lens, by utilizing a diagonal-addition difference signal obtained by making a subtraction between addition signals each obtained by adding electric signals, for the light-receiving segments that are situated diagonally to each other, among electric signals, corresponding to light amounts detected at the four light-receiving segments, which are outputted from the optical unit, the astigmatism addition lens being configured with a reflected-light focusing lens for focusing the reflected light beam and a flat-plate optical element disposed slanted from the optical axis of the reflected beam that is focused by the reflected-light focusing lens, and the reflected light beam penetrating the flat-plate optical element, the optical device further comprising:

a first control signal generator for detecting a first control signal, by making a subtraction between addition values each obtained by adding light amounts detected at the light-receiving segments, among the four light-receiving segments, which are adjacent to each other with respect to the first dividing line; and a second control signal generator for detecting a second control signal, by making a subtraction between addition values each obtained by adding light amounts detected at the light-receiving segments, among the four light-receiving segments, which are adjacent to each other with respect to the second dividing line, the first control signal and the second control signal being corrected by an offset component caused by asymmetry in an intensity distribution of the reflected light beam to which astigmatism has been added, and the diagonal-addition difference signal being corrected by a multiplication signal obtained by making a multiplication among the corrected first control signal, the corrected second control signal, and a predetermined constant.

2. The optical device according to claim 1, wherein the multiplication signal is normalized by a total value of light amounts received through the four light-receiving segments of the photodetector.

3. The optical device according to claim 1, further comprising:

a spot-focusing optical-axis-direction shifting actuator for shifting a focal point of a focused spot, formed on the subject by a light beam that is focused by the light focusing lens, in a direction along the optical axis of the light beam; and an optical-axis-direction drive circuit for generating a drive signal utilized to drive the spot-focusing optical-axis-direction shifting actuator, based on the amount of an focus error detected by the focus-error detector.

4. The optical device according to claim 1, further comprising:

a spot-focusing optical-axis-perpendicular-direction shifting actuator for shifting a focal point of a focused spot, formed on the subject by a light beam that is focused by the light focusing lens, in a direction perpendicular to the optical axis of the light beam; and an optical-axis-perpendicular-direction drive circuit for generating a drive signal utilized to shift the focal point of the focused spot in a direction perpendicular to the optical axis of the light beam.

5. The optical device according to claim 4, further comprising a position sensor for detecting a travel amount, of the light focusing lens, in a direction perpendicular to the optical axis of the optical beam, wherein the first control signal or the second control signal is an output signal of the position sensor.

6. The optical device according to claim 4, wherein the first control signal or the second control signal is the drive signal, outputted from the optical-axis-perpendicular-direction drive circuit, for driving the spot-focusing optical-axis-perpendicular-direction shifting actuator.

7. The optical device according to claim 1, wherein the direction along which the reflected light beam travels on the photodetector, in accordance with the direction along which a spot-focusing optical-axis-perpendicular-direction shifting actuator make a focused spot travel on the subject, is parallel neither to the first dividing line nor to the second dividing line.

8. An optical disk apparatus comprising the optical device according to claim 1, information data being recorded on or reproduced from an optical information recording medium formed in such a way that the information data is recorded on a spiral or circular information track or reproduced from the information track.

9. The optical disk apparatus according to claim 8, further comprising:

a radial-position controller for driving the light focusing lens in the radial direction of the optical information recording medium; and a tracking-error-signal detector for generating a tracking error signal by combining respective light amounts received through the light-receiving segments of the photodetector, wherein the first control signal or the second control signal is an offset value of the tracking error signal generated by the tracking-error-signal detector.

10. The optical disk apparatus according to claim 9, wherein the tracking-error-signal detector detects the tracking error signal, in accordance with any one of a differential-phase- detection method, a push-pull method, and a differential-push-pull method.

11. An optical device provided with
an optical unit comprising:
a light source for emitting a light beam;
a light focusing lens for focusing the light beam onto a subject;
an astigmatism addition lens for adding astigmatism to a reflected light beam that is the light beam that has been reflected by the subject; and
a photodetector, having a light-receiving region divided into four segments by a first dividing line and a second dividing line that cross each other, for detecting through the light-receiving region a light amount of the reflected light beam to which astigmatism has been added by the astigmatism addition lens and converting the light amount into an electric signal, and
a focus-error detector for detecting an amount of focus error, with respect to the subject, of the light beam that is focused by the light focusing lens, by utilizing a diagonal-addition difference signal obtained by making a subtraction between addition signals each obtained by adding electric signals, for the light-receiving segments that are situated diagonally to each other, among electric signals, corresponding to light amounts detected at the four light-receiving segments, which are outputted from the optical unit, the astigmatism addition lens being a hologram optical element having a diffraction plane formed at at least one of the light-incident and light-emitting sides thereof, the optical device further comprising:

a first control signal generator for detecting a first control signal, by making a subtraction between addition values each obtained by adding light amounts detected at the light-receiving segments, among the four light-receiving segments, which are adjacent to each other with respect to the first dividing line; and a second control signal generator for detecting a second control signal, by making a subtraction between addition values each obtained by adding light amounts detected at the light-receiving segments, among the four light-receiving segments, which are adjacent to each other with respect to the second dividing line, the first control signal and the second control signal being corrected by an offset component caused by asymmetry in an intensity distribution of the reflected light beam to which astigmatism has been added, and the diagonal-addition difference signal being corrected by a multiplication signal obtained by making a multiplication among the corrected first control signal, the corrected second control signal, and a predetermined constant.

12. The optical device according to claim 11, wherein the multiplication signal is normalized by a total value of light amounts received through the four light-receiving segments of the photodetector.

* * * * *